March 4, 1969      F. H. WOOD      3,430,605

VISUAL INDICATORS

Filed Dec. 17, 1964      Sheet _1_ of 3

Francis Harold Wood,
Inventor

By Wenderoth, Lind and Ponack,
Attorneys

March 4, 1969  F. H. WOOD  3,430,605
VISUAL INDICATORS
Filed Dec. 17, 1964  Sheet 2 of 3
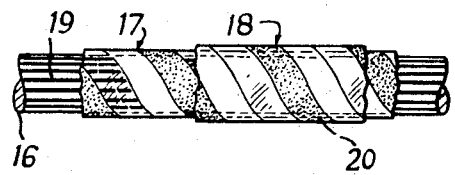
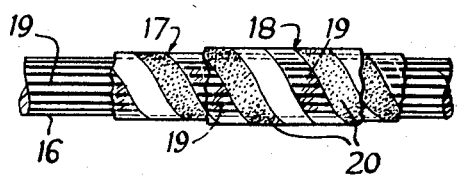
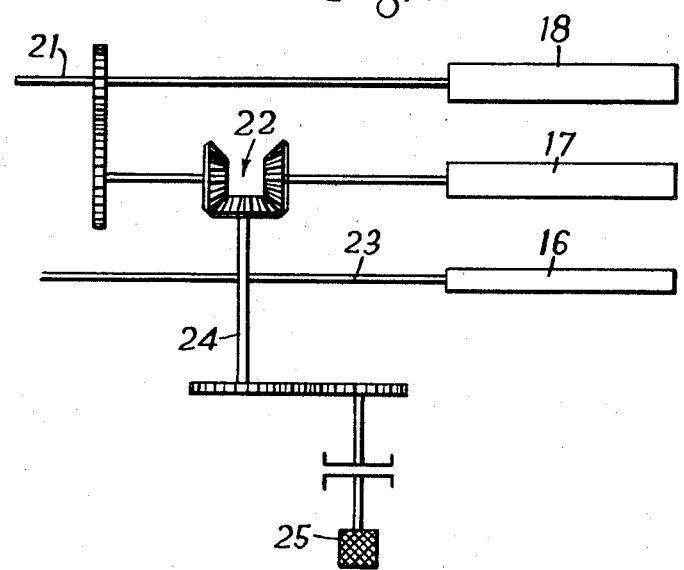
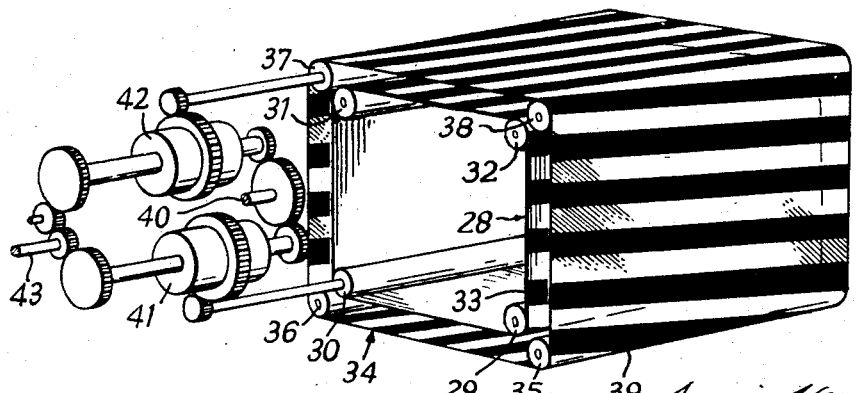

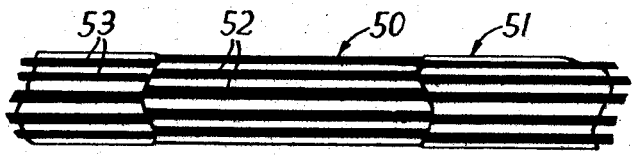
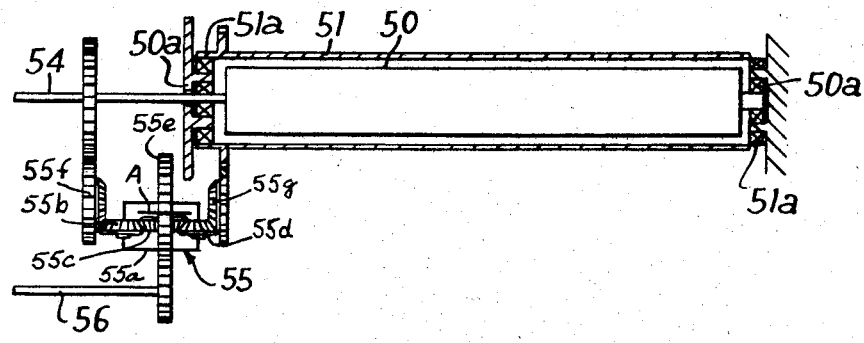
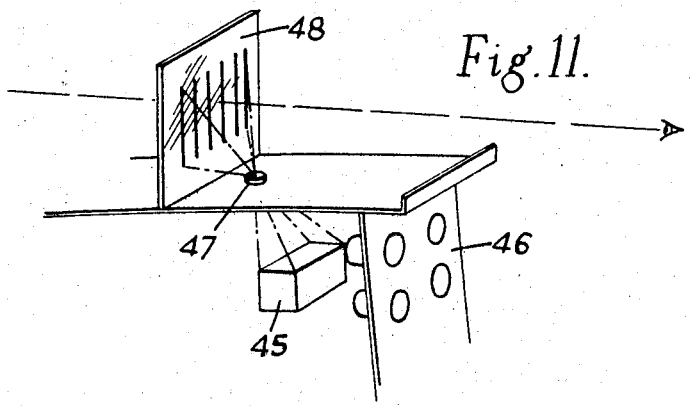

United States Patent Office 3,430,605
Patented Mar. 4, 1969

3,430,605
VISUAL INDICATORS
Francis Harold Wood, Watford, England, assignor to Elliott Brothers (London) Limited, London, England
Continuation-in-part of application Ser. No. 206,467, June 29, 1962. This application Dec. 17, 1964, Ser. No. 419,076
Claims priority, application Great Britain, June 29, 1961, 23,618/61
U.S. Cl. 116—129          9 Claims
Int. Cl. G09f 9/00, 11/24

This application is a continuation-in-part of application Ser. No. 206,467 filed June 29, 1962, now abandoned.

This invention relates to visual indicators and particularly indicators of the kind which provide a display which is capable of conveying intelligence to an observer even though his eyes are occupied in viewing other objects.

Instruments of this kind operate by exciting the parafovea of the human eye which readily responds to a changing optical stimulus and to this end they are arranged to provide a display of such kind that its movement readily attracts the attention of an observer even though the display is not in his direct line of vision.

One simple known instrument of this kind comprises a rotatable cylinder, the surface of which carries a contrasting marking arranged in the form of a helical band round the cylinder. In use, the cylinder is rotated and the apparent movement of the band on its background indicates by its speed and direction of movement the magnitude and sense of the quantity to be displayed. The construction necessarily involves that the contrast, i.e. the ratio of the area of the band and the area of the background, between the band and the background is fixed. In some uses of such an instrument information is only conveyed by the movement of the display. It is therefore necessary to select the contrast such that on the one hand the display will not distract attention when it is stationary and on the other hand when it moves its movement will quickly attract the attention of the observer and will convey intelligible information to him. It has furthermore been found that different individuals respond differently to such a display and that a contrast that is suitable for one is not necessarily acceptable to another.

A further disadvantage of this simple form of instrument is that it is incapable of displaying information relating to more than one variable quantity.

It is therefore an object of the present invention to provide an improved instrument which overcomes these difficulties.

More specifically it is an object of the invention to provide an improved instrument in which the contrast can be adjusted to suit the requirement of an observer.

Another object of this invention is to provide an instrument in which the display may be rendered substantially invisible when no information has to be conveyed to the observer.

A still further object of this invention is to provide an improved form of instrument which can be arranged to display information concerning more than one variable.

Other objects and advantages of the present invention will become apparent during the course of the following description of some forms of the improved instrument with reference to the drawings, in which:

FIGURE 5 is a front elevation, partly broken away, of a display producing mechanism of another form of instrument of this invention, in one position;

FIGURE 6 is a view similar to FIGURE 5 showing the mechanism of FIGURE 5 with the parts in different positions;

FIGURE 7 is a schematic structural diagram of one form of instrument using the mechanism of FIGURES 5 and 6;

FIGURE 8 is a perspective view of another form of the instrument of this invention;

FIGURE 9 is a front elevation of the display producing mechanism of a still further form of instrument of the invention;

FIGURE 10 is a schematic structural diagram of one form of instrument using the mechanism of FIGURE 9, and FIGRE 11 is a schematic perspective view of one method of mounting the improved instrument of this invention on an aircraft.

Figure 1:
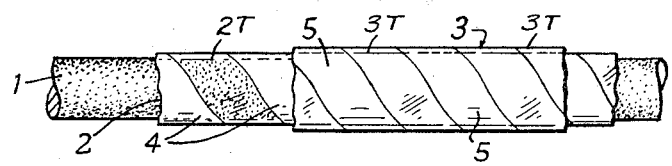
FIGURE 1 is a front elevation, partly broken away, of the display producing mechanism of one form of the instrument of this invention in one position.
Figure 2:
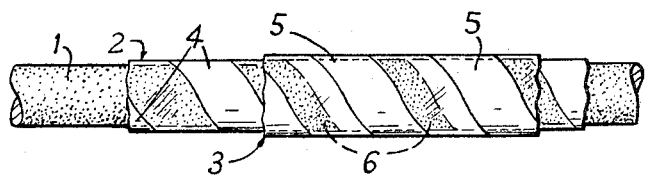
FIGURE 2 is a view similar to FIGURE 1 showing the mechanism of FIGURE 1 with the parts in different positions.
Figure 3:
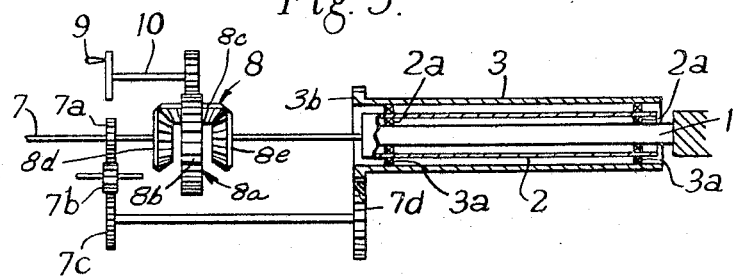
FIGURE 3 is a schematic structural diagram of an instrument using the mechanism of FIGURES 1 and 2.
Figure 4:
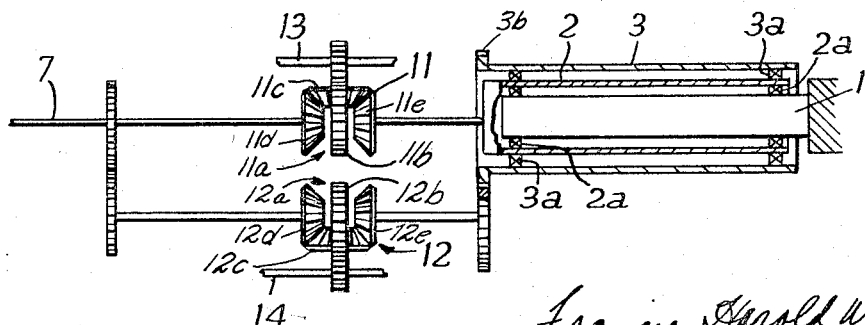
FIGURE 4 is a schematic structural diagram of another form of instrument using the mechanism of FIGURES 1 and 2.

Referring firstly to FIGURES 1 and 2, the display producing mechanism there shown comprises three sheet-like elements arranged as coaxial cylinders 1, 2 and 3 of which the innermost cylinder 1 is fixed while the middle cylinder 2 and the outer cylinder 3 are mounted for rotation about the common axis by ball races 2a and 3a respectively (FIGURES 3 and 4).

The inner cylinder 1 is uniformly coloured black, for example, while the middle and outer cylinders are formed of transparent material and each provided with bands 4, 5 in the form of a helix of a contrasting colour which may, for example, be white. The two helical bands 4, 5 have the same pitch and may have an equal width/space ratio. With the two cylinders 2 and 3 in the angular position shown in FIGURE 1, there will be an all-white appearance and no display will occur even if both cylinders rotate. However, if one cylinder is rotated relative to the other, the white helical band 5 on the outer cylinder 3 will overlap the white helical band 4 on the middle cylinder 2 more and more and the black surface of the inner cylinder 1 will become visible through the transparent portions 2T and 3T of cylinders 2 and 3 respectively as a series of black bands 6. FIGURE 2 shows the mechanism in a position where relative rotation of the two cylinders 2 and 3 has revealed the cylinder 1 to the extent of providing a contrast ratio of 3:1 white to black. Further relative rotation will increase this contrast up to a maximum of 1:1. As soon as some of the black surface of cylinder 1 can be seen, if the cylinders 2 and 3 are rotated together at the same speed, a display will be provided which is the same as that provided by the known instrument having a single cylinder with a black band on a white ground, that is to say the visible black bands 6 will appear to move to the left or right according to the direction of rotation of the cylinders and at a speed which is proportional to the speed of rotation. The instrument of this invention, however, offers the further facility that the width of the black bands 6 can be varied either manually or automatically or both while the two cylinders 2, 3 rotate.

The simplest arrangement is shown in FIGURE 3. Here the cylinder 3 is shown as being driven by a ring gear 3b thereon via gear wheels 7a, 7b, 7c and 7d by a shaft 7, the speed and direction of rotation of which is proportional to the magnitude and sense of the quantity to be displayed. The shaft 7 also drives cylinder 2 through a differential 8 comprising a cage 8a rotatably driven by a ring gear 8b and carrying a freely mounted bevel gear 8c which engages to further bevel gears 8d and 8e. The differential may be adjusted by a manually operable control 9 which produces a rotation of shaft 10 and through the differential 8 a relative rotation between cylinders 2 and 3. In such arrangement rotation of shaft 7 will cause cylinders 2 and 3 to rotate at the same speed and in the same direction, while operation of control 9 will produce relative rotation of the two cylinders to vary the width of the bands 6. Instead of rotating shaft 10 manually, this could be effected automatically in accordance with the magnitude of a second variable quantity, in which case the instrument would operate to convey information concerning two different or possibly related quantities.

An arrangement providing for both automatic and manual control of the width of the bands 6 is illustrated in FIGURE 4. Here, shaft 7 drives cylinders 2 and 3 through respective differentials 11 and 12, while differential 11 may be controlled manually over shaft 13 and differential 12 controlled automatically over shaft 14. The equivalent components of differentials 11 and 12 are denoted by the same suffixes as the components of differential 8. Such arrangement allows the observer to adjust the contrast of the display, that is the ratio of the width of the black bands 6 to the width of the intervening white spaces, to his liking, while this may also be varied automatically to convey additional information. The arrangement could also be used in a different manner by arranging that the automatic control operation to provide a display when information is to be conveyed and to suppress the display, that is to rotate the cylinders relative to one another to provide an "all-white" appearance when no information is to be displayed. Such arrangement could be used to show by the existence of a display the occurrence of a deviation from a datum, the display being stationary if the deviation is constant and moving at a speed and in a direction which is proportional to the rate of change and sense of such deviation.

It will be appreciated that the display provided by the mechanism of FIGURES 1 and 2 may also be provided by an arrangement using only two cylinders, the inner one having a black band on a white ground and the outer one having a white band on a transparent ground, the pitch and width/space ratio being equal in each case. (See FIGURES 9 and 10.)

FIGURES 5 and 6 show a modified form of the display producing mechanism of FIGURES 1 and 2. The arrangement, which provides two different displays, again comprises three coaxial cylinders but in this case the innermost cylinder 16 as well as the middle and outermost cylinders 17 and 18 are arranged for rotation about the common axis. Moreover, the innermost cylinder 16 has a white surface on which there is a pattern of longitudinal black stripes 19. The middle and outer cylinders 17 and 18 are each transparent and provided with adjacent black and white helical bands, the arrangement being such that in one limiting position of relative rotation of the cylinders 17 and 18, the black helical bands lie over one another forming bands 20 of minimum width while the white helical bands lie side by side and obscure the innermost cylinder 16. Upon relative rotation the width of the black bands 20 will increase, FIGURE 5 shows the arrangement in an intermediate position, up to twice the original width, when the black helical bands will separate to reveal through the transparent portions of the cylinder stripes 19 of the surface of the innermost cylinder 16, as shown in FIGURE 6. In such circumstances the rotation of cylinder 16 will provide its own display (stripes 19) and may be used to convey information different from that conveyed by the rotation of cylinders 17 and 18.

FIGURE 7 shows one possible form of instrument incorporating the display producing mechanism of FIGURES 5 and 6. To achieve clarity of the drawing cylinders 16, 17 and 18 are not shown coaxially disposed. The mechanics required to achieve this for example would be that cylinder 16 could be rotatably mounted by any suitable bearing and ball races could be used to rotatably mount cylinders 17 and 18 (as 2a and 3a, FIGURE 3). Simple gearing would be required to provide drive between the respective input shafts and cylinders 17 and 18 (i.e. as 7a, 7b, 7c and 7d, FIGURE 3). Here a shaft 21 is arranged to rotate the outermost cylinder 18 and through differential 22 the middle cylinder 17. A second shaft 23 is arranged to rotate the innermost cylinder 16 while a third shaft 24 is arranged to adjust differential 22 which is also adjustable to manual control 25. The shaft 21 may be arranged to rotate at a speed and in a direction which is a function of the rate and sense of deviation from a first datum so that the speed and direction of movement of the black bands 20 display this information. The shaft 24 may be arranged to rotate in proportion to the magnitude of a deviation from a second datum so as to cause the black helical bands to separate when the magnitude exceeds a predetermined quantity, while the shaft 23 may be arranged to rotate at a speed and in a direction which is a function of the rate and sense of the deviation from the second datum so that the speed and direction of the movement of the innermost cylinder 16 when revealed (19) by the separation of the black helical bands will display this information. The manual control 25 may be used to provide an overriding control of contrast as in the previously described arrangements.

The above described forms of display producing mechanisms have used rigid coaxial cylinders. This, however, is not essential since the "cylinders" could be formed of flexible material in the shape of an endless belt which, for example, is supported and driven by means of rollers. Such flexible endless belts, which could consist of endless webs, are very convenient since they may be adapted to the desired overall shape of the instrument, an important advantage particularly for aircraft, and at the same time can be disposed so as to give a large display field.

One embodiment of an instrument using such flexible endless belts is shown in FIGURE 8. In this arrangement there are two such endless belts each consisting of an endless web. The inner web 28, which is supported as shown on four rollers 29–32, is provided with a system of black bands 33 on a white ground, while the outer web 34, which is supported on a system of rollers 35–38, is provided with a system of black bands 39 on a transparent ground. It will be noted that these bands extend only at a slight angle to the axis of the endless belt whereas in the embodiment of FIGURES 1, 2, 5 and 6 they extend nearly normal to the axis. The only reason for this difference is that in the former embodiments the display was required to move to the left or the right whereas in the present embodiment it is required to move up or down. It will be seen that the two webs 28 and 34 extend close to one another in the display area, the rollers 29, 32 and 35, 38 being suitably positioned for this purpose, and that they are moved by driving the rollers 30 and 37 respectively. As shown, the movement of the webs is effected by shaft 40 which drives rollers 30 and 37 through differentials 41 and 42 respectively, while relative movement of the webs is effected by the action of shaft 43 on the differentials.

In one particular use of this embodiment the webs are normally so disposed that the black band 39 on the outer web 34 overlies the white ground of the inner web 28, thus giving an "all-black" appearance which produces no display. Rotation of shaft 43 causes relative movement of the black bands 33, 39 so as to reveal the white ground of web 28 through the transparent ground of web 34, the thin white bands so formed increasing in width up to a maximum.

The width of the white bands of the display could be used to indicate the magnitude of a deviation from a datum, the width being reduced to vanishing point when there is no deviation while the movement of the bands produced by rotation of shaft 40 could be used to indicate the rate and sense of the deviation.

FIGURE 9 shows a form of display producing mechanism similar to that illustrated by FIGURE 8 but in which the endless webs are replaced by two coaxially disposed cylinders 50 and 51 (51 part cut away), the inner cylinder 50 which is supported by ball races 50a (FIGURE 10) is provided with a system of black bands 52 on a white ground, while the outer cylinder 51, which is supported by ball races 51a (FIGURE 10) is provided with a system of black bands 53 on a transparent ground. This transparent ground can be provided by cutting slots in the outer cylinder 51.

In this case the bands extend parallel to the common axis of the cylinders so providing, in use, a display which moves up or down.

FIGURE 10 illustrates one form of instrument using the display mechanism of FIGURE 9, this form of instrument being similar in operation to that of FIGURE 3. A shaft 54 is connected to directly drive the inner cylinder 50 whilst the outer cylinder 51 is driven via a differential 55 comprising a cage 55a carrying three meshed beveled gears 55b, 55c and 55d, the cage being rotatable about an axis A and driven by a ring gear 55e. Gears 55b and 55d mesh with gears 55f and 55g. Relative rotation between the cylinders 50 and 51 is achieved by rotation of shaft 56 coupled to differential 55. This shaft 56 can be driven automatically or manually.

It should be appreciated that although not shown a similar operating mechanism to that illustrated in FIGURE 4 could be utilised with this instrument by placing a further differential on shaft 54 between the driving source (not shown) and the connection to cylinder 50. This arrangement would then provide for both automatic and manual control.

The display formed by the arrangement illustrated in FIGURES 9 and 10 is identical to that described for FIGURE 8 and therefore will not be repeated.

FIGURE 11 illustrates one possible method of arranging the instrument of this invention on an aircraft. As shown, the instrument 45 is mounted behind the pilot's instrument panel 46 and an image of the display is projected by optical means 47 on to the windscreen 48 in the pilot's line of sight. If necessary, the windscreen could be partly silvered for better visibility of the display.

I claim:
1. A visual indicator for producing a display which is capable of exciting the parafovea of the human eye of an observer, comprising a first element, a second element, the second element being adapted to be nearer an observer than the first element, said first and second elements each having a series of spaced parallel visible bands, the two series of bands being in similar patterns, the second element having the spaces between the bands transparent, synchronous driving means operatively coupled to said elements for moving both together in synchronism, the bands being inclined to the direction of movement of the elements, and means operatively coupled to the said driving means for moving one said element relative to the other.

2. A visual indicator as claimed in claim 1 wherein the means for relatively moving the elements is a differential driving means.

3. A visual indicator as claimed in claim 1 wherein the said elements are two rigid cylinders which are concentric one within the other, and mounting means on which said cylinders are rotatably mounted for rotation about their common axis, on mounting means.

4. A visual indicator as claimed in claim 1 wherein the said elements are endless webs.

5. A visual indicator as claimed in claim 1 wherein the spaces between the bands of the first element are opaque and are a color which contrasts with the color of the bands.

6. A visual indicator as claimed in claim 1 wherein the spaces between the bands on the first element are transparent and said indicator further comprises a third element having a surface behind said first and second elements as a background and being of a color which contrasts with the color of the said bands.

7. A visual indicator as claimed in claim 6 wherein the third element is a rigid cylinder operatively coupled with driving means for being moved thereby.

8. A visual indicator as claimed in claim 7 wherein the said surface has thereon visible markings which can be seen by the observer when the transparent spaces of the said first and second elements are overlapping.

9. A visual indicator as claimed in claim 1 in which said synchronous driving means includes a rotatable shaft and means operatively coupled respectively to each of said first and second elements, and said means for relatively moving the elements is a differential driving means comprising a differential gear connected between said shaft and the means coupled to one said element, said rotatable shaft being connected directly to the other said element and means operatively coupled to said differential gear for controlling said differential gear.

References Cited

UNITED STATES PATENTS

| | | | |
|---|---|---|---|
| 2,213,261 | 9/1940 | Sayre | 40—137 |
| 2,238,718 | 4/1941 | De Florez et al. | 116—129 |
| 2,246,001 | 6/1941 | Powers | 88—1 |
| 2,256,170 | 9/1941 | Powers | 116—129 |
| 2,446,047 | 7/1948 | Kent | 88—1 |
| 2,659,264 | 11/1953 | Tuttle et al. | 88—1 |
| 2,857,802 | 10/1958 | Cail | 88—14 |
| 2,992,334 | 7/1961 | Kaestner et al. | 88—14 |
| 3,037,420 | 6/1962 | Stade | 88—14 |
| 3,176,265 | 3/1965 | Schweighofer | 33—204.2 |

LOUIS J. CAPOZI, Primary Examiner.

U.S. Cl. X.R.

33—204; 40—86; 88—14; 116—135; 350—272